United States Patent [19]
Hoshi

[11] Patent Number: 5,943,102
[45] Date of Patent: *Aug. 24, 1999

[54] IMAGE DATA DECODING METHOD AND APPARATUS COMPARING DECODE AND DISPLAY PROGRESS

[75] Inventor: Takayoshi Hoshi, Kyoto, Japan

[73] Assignee: Rohm Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,932

[22] Filed: Mar. 21, 1997

[30] Foreign Application Priority Data

Mar. 22, 1996 [JP] Japan ................................. 8-065899

[51] Int. Cl.$^6$ ....................................... H04N 9/64
[52] U.S. Cl. ......................... 348/715; 348/716; 348/419; 348/420
[58] Field of Search .................................. 348/715, 716, 348/469, 470, 575, 409, 398, 402, 420, 419; 345/143; H04N 9/64

[56] References Cited

U.S. PATENT DOCUMENTS

| | | | |
|---|---|---|---|
| 5,379,071 | 1/1995 | Parikh et al. ............................ | 348/409 |
| 5,469,228 | 11/1995 | Kim et al. ................................ | 348/715 |
| 5,479,212 | 12/1995 | Kurobe et al. .......................... | 348/409 |
| 5,539,428 | 7/1996 | Bril et al. ................................. | 345/143 |
| 5,557,332 | 9/1996 | Koyanagi et al. ....................... | 348/402 |
| 5,585,863 | 12/1996 | Hackett et al. .......................... | 348/716 |
| 5,621,464 | 4/1997 | Teo et al. ................................. | 348/390 |

*Primary Examiner*—Tommy P. Chin
*Assistant Examiner*—Gims Philippe
*Attorney, Agent, or Firm*—Fish & Richardson P.C.

[57] ABSTRACT

An image data decoding and displaying apparatus is equipped with a decode map set for storing decoded data for every frame into an empty areas in a memory. This set contains a plurality of maps each describing a memory area for a frame. A map is changed by a unidirectional counter for every start of a decode operation in frames. A display map set is also provided with a bidirectional counter. Normally, these two counters are incremented every time a frame is decoded and displayed, respectively, so the same maps are referred to from decode operation and display operation. In the display operation, bidirectional counter is decremented by one if data is not decoded in time for display, so that a map for an immediately preceding picture is referred to. In such a case, the previous picture is displayed twice in place of the current picture. Display transition from the current picture to the previous one is performed smoothly changing maps consistently for these pictures.

14 Claims, 11 Drawing Sheets

| CNTD / CNTV | 0 | 1 | 2 | 3 | 4 | 5 |
|---|---|---|---|---|---|---|
| x \ y | Bn | Bn+1 | Bn+2 | Bn+3 | Bn+4 | Bn+5 |
| 0 | 0 | ᵃ③ | 6 | 9 | 12 | |
| 1 | 1 | 4 | 7 | 10 | 13 | |
| ᵍ② | 2 | 5 | ⑧ᶜ | 11 | 14 | |
| 3 | 3 | 6 | ⑨ᵈ | 12 | | 0 |
| 4 | 4 | 7 | 10 | 13 | | 1 |
| 5 | 5 | 8 | 11 | 14 | | 2 |
| ᶠ⑥ | 6 | ⑨ₑ | 12 | | 0 | 3 |
| 7 | 7 | 10 | 13 | | 1 | 4 |
| 8 | 8 | 11 | 14 | | 2 | 5 |
| 9 | 9 | 12 | | 0 | 3 | 6 |
| 10 | 10 | 13 | | 1 | 4 | 7 |
| 11 | 11 | 14 | | 2 | 5 | 8 |
| 12 | 12 | | ᵇ⓪ | 3 | 6 | 9 |
| 13 | 13 | | 1 | 4 | 7 | 10 |
| 14 | 14 | | 2 | 5 | 8 | 11 |
| 15 | | 0 | 3 | 6 | 9 | 12 |
| 16 | | 1 | 4 | 7 | 10 | 13 |
| 17 | | 2 | 5 | 8 | 11 | 14 | x: NUMBER OF MACROBLOCK AREA PMBLi ON MEMORY SIDE
y: DECODING PICTURE

IMAGE DATA DECODING METHOD AND APPARATUS COMPARING DECODE AND DISPLAY PROGRESS

BACKGROUND OF THE INVENTION

1. Field of the Invention

This invention relates to an image data decoding and displaying method and an apparatus therefor. In this method and apparatus, decoded frame data are sequentially stored in a memory and read therefrom to display. This invention can be applied, for example, to an MPEG decoder.

2. Description of the Prior Art

Improving technology for compressing images into codes and storing them into various record media such as CD-ROM or DAT has become popular, as represented by the international encoding standards MPEG. Today home appliance manufacturers and computer manufacturers are making efforts to develop multimedia information home appliances and intend to market goods which meet MPEG. Below is an outline of processing based on MPEG.

Figure 1:
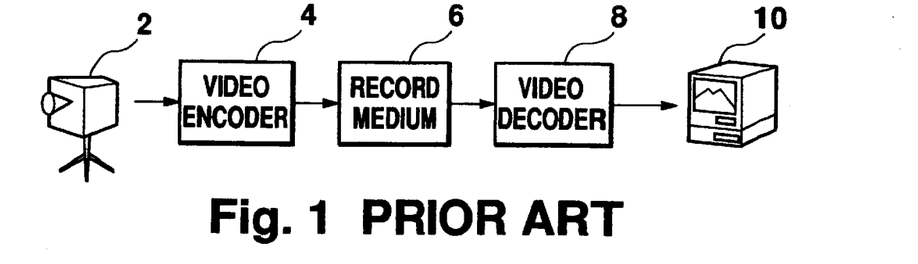
FIG. 1 is a schematic diagram showing the flow of encoding and decoding images based on MPEG.

FIG. 1 is a typical diagram showing the flow of image encoding and decoding based on MPEG. As shown in FIG. 1, images input from an image input device 2, such as a camera, are compressed and encoded by a video encoder 4. Quantization processes and DCT (discrete cosine transform) are usually involved in encoding. Encoded data is written into a record medium 6.

Decoding follows a reverse process: data is read from the record medium 6 and decoded by a video decoder 8. Decoding is preceded by a reverse quantization process and reverse DCT. Image data decoded by the video decoder 8 is output in a displayable format at a displayable timing and reproduced and displayed by a display device 10. Decoding is performed with forward prediction from past reproduced images and reverse prediction from future reproduced images (bidirectional prediction), as necessary.

Figure 2:
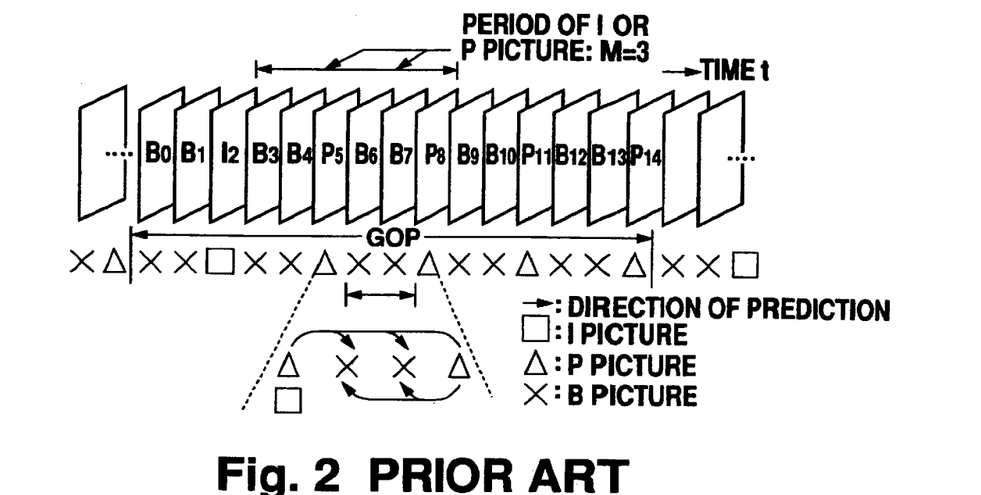
FIG. 2 is a schematic diagram showing the configuration of a GOP (group of pictures) of MPEG.

FIG. 2 is a schematic diagram of a GOP (group of pictures) of MPEG. Fifteen screens in FIG. 2 (called pictures in MPEG) can be regarded to be taken in this order. These fifteen pictures, called a GOP in MPEG, form one predictive process unit. That is, encoding and decoding can be done through cross reference to pictures within one GOP, wherein a GOP is a unit of random access. Motion images can be encoded and decoded by continuously processing sets, each of which is comprised of one GOP and its sequence header.

As shown in FIG. 2, there are three kinds of pictures: I, P, and B. An I picture (image encoded within its frame) is limitedly encoded within its own frame and reference to other pictures is not necessary for decoding. A P picture (image encoded with forward prediction) requires forward prediction; only past reproduced images are necessary for decoding. However, a B picture (image encoded with bidirectional prediction) requires bidirectional prediction; I and P pictures which are reproduced after the B picture will also be referenced. In FIG. 2 the direction of prediction is shown with an arrow. When a GOP is actually encoded, the data of I or P pictures input after the B picture must be known. Therefore, picture I2, for example, is encoded before pictures B0 and B1 and the encoded data is written into the record medium 6. In FIG. 2, the period M of I or P pictures applied to bidirectional prediction is three.

Figure 3:
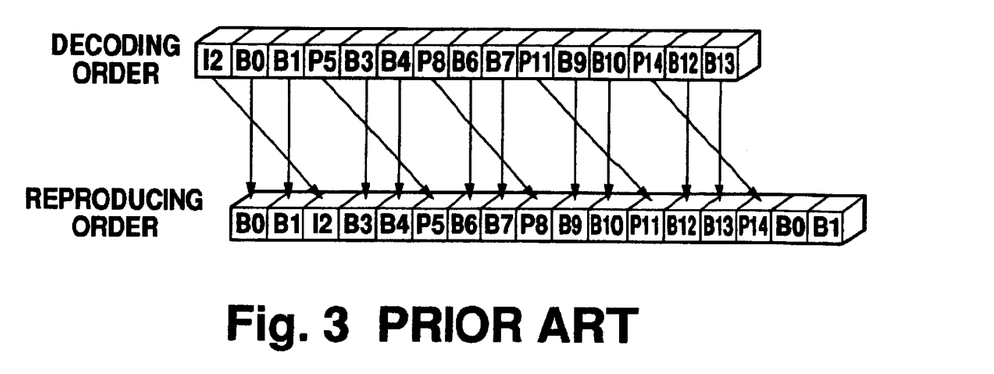
FIG. 3 shows the decoding and reproducing order based on MPEG.

FIG. 3 is a diagram showing the decoding and reproducing order based on MPEG. The upper row of FIG. 3 indicates the decoding order, while the lower row indicates the reproducing order. The decoding order is the same as the encoding order; that is, the decoding order corresponds to the order in which pictures are arranged in the record medium 6. Therefore, on the decoding side, I2, B3, B4, ... pictures are read in this order from the record medium 6, decoded, re-ordered, and then output in the original order. In FIG. 3, the I2 picture must not be output before the B0 and B1 pictures, so the I2 picture is held in an internal memory until the B0 and B1 pictures are output. Similarly, other I and P pictures must be held in a memory until their corresponding B pictures are output. As shown in FIG. 3, decoded B pictures are output as soon as possible in order to enable adoption of a small capacity memory.

Figure 4:
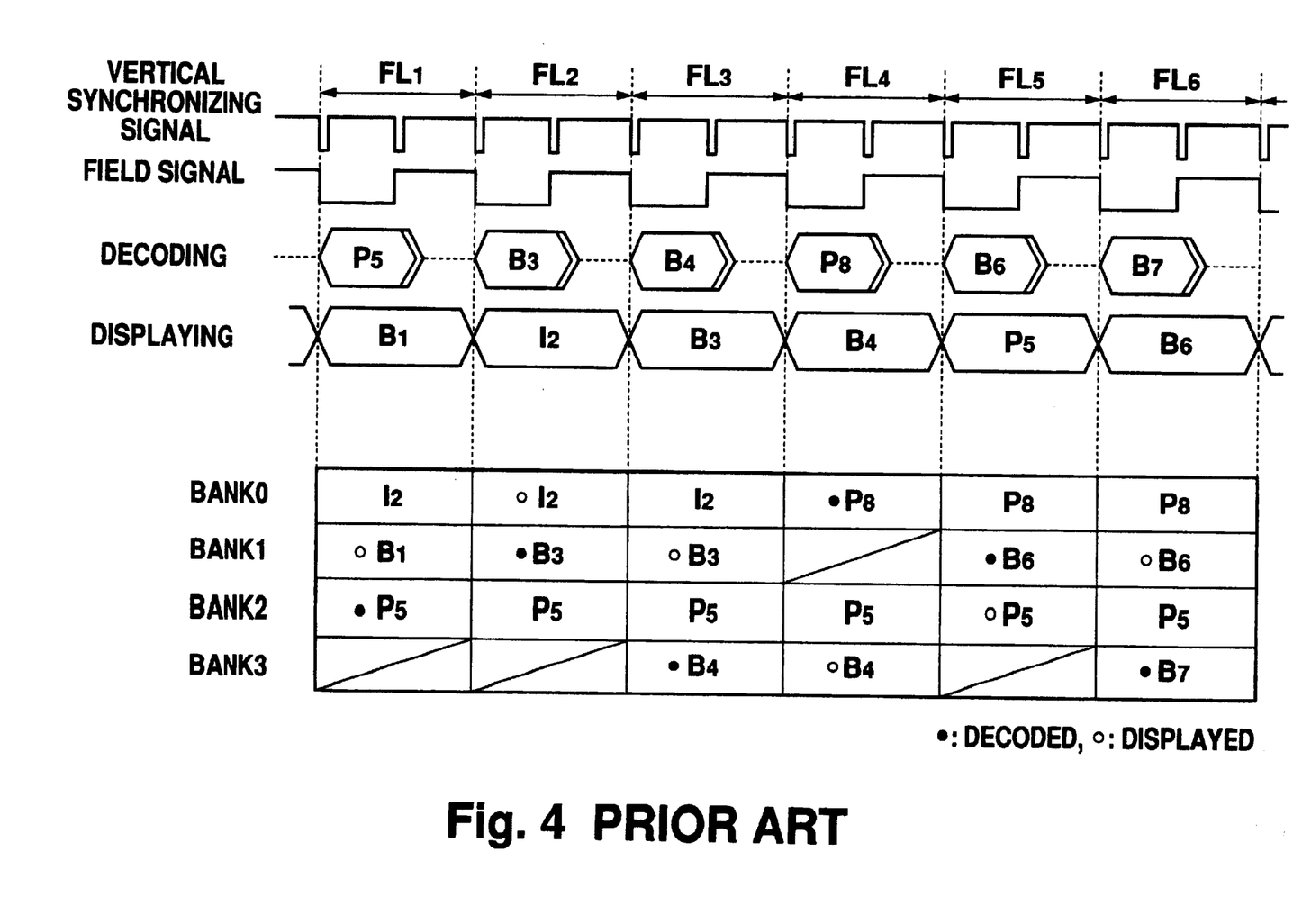
FIG. 4 is a diagram showing the process timing of decoding and displaying by the conventional video decoder 8.

FIG. 4 is a diagram showing the process timing of decoding and display by a conventional video decoder 8. The lower part of FIG. 4 shows memory banks in the video decoder 8 and pictures held in each bank at each timing. This memory has 4 banks for reasons described below. Each bank corresponds to an area in which one frame (one picture) of data is stored.

As shown in FIG. 4, periods of frames FL1–6 depend on vertical synchronizing signals. Each frame period consists of two field periods. It is assumed that the low state of a field signal indicates the first field period and the high state of the field signal indicates the second field period.

In FIG. 4, the time at which I2, B0, and B1 pictures of some GOP have already been decoded is the starting point of FL1. Subsequently, P5, B3, B4, ... pictures will be decoded as in the decoding order of FIG. 3. However, with display operation, the starting point of FL1 occurs only when picture B0 has been displayed. Subsequently, the B1, I2, ... pictures are displayed as in the reproducing order of FIG. 3. Decode and display operation in each frame period will be described below.

(1) FL1

The B1 picture is displayed. To do this, the B1 picture is held in a bank (assumed to be a bank 1) until the end of FL1. The I2 picture to be displayed in FL2 is still held in another bank (assumed to be bank 0). Apart from display operation, the P5 picture is decoded. To store the decoded data, still another bank (assumed to be a bank 2) is assigned. Decoding is done in macroblocks (one macroblock is 16 pixels by 16 lines) and data is stored in a memory in macroblocks. In this frame a bank 3 is an empty area (unused).

(2) FL2

The I2 picture is displayed. Picture I2 is held in bank 0 until the end of this frame. Picture P5 to be displayed later is still held in the bank 2. The data of picture B1 which has already been displayed is unnecessary; therefore, bank 1 is assigned to picture B3 to be decoded. In this frame, too, bank 3 is an empty area.

(3) FL3

The I2 picture had been displayed, but it is still held in bank 0 because the reference to picture I2 is needed for picture B4 which is being decoded. Picture B3 which is being displayed and picture P5 to be displayed later stay in the banks. Picture B4 which is being decoded is stored in macroblocks in bank 3. To achieve this, the memory must have four banks.

In this way a timing chart of FIG. 4 is obtained according to the rules: "a B picture which has been already displayed is unnecessary" and "I and P pictures are held for a certain period to decode the B pictures between them." As shown in FIG. 4, all four banks are used every three frame periods (FL3, 6, 9, ... ).

As was stated, the conventional video decoder 8 requires a memory having four banks to hold a decoded picture until the subsequent B pictures are decoded and to hold the present picture until it is actually displayed.

Memory capacity necessary to reserve four banks will be described below. For a screen of an NTSC system having 352 pixels×240 lines, one frame corresponds to about 123.8 Kbytes of data, and four frames will have 495.2 Kbytes of data. In addition, a 40–50 Kbyte temporary buffer called a VBV buffer should be prepared with MPEG, resulting in a total capacity of about 540–550 Kbytes. This exceeds 4 Mbits, and so one 4 Mbit DRAM will result in a shortage of capacity. For a screen of a PAL system having 352 pixels× 288 lines, one frame corresponds to about 148.5 Kbytes of data. Thus, the same problem occurs.

For the above reason, the conventional video decoder 8 increases its memory capacity, for example, by adding one 1 Mbit DRAM to one 4 Mbit DRAM. To make an apparatus smaller and less expensive, it is desirable to use only one 4 Mbit DRAM. To solve this problem, the following method, for example, based on the above prior art is possible. A B picture which cannot be stored in a memory is discarded every three frames and the picture displayed in the preceding frame is simply displayed twice. However, such relaxation of specifications will result in lowered image quality, and is therefore not desirable.

SUMMARY OF THE INVENTION

In view of the above, the present applicant proposed in a Japanese Patent Application No. Hei 8-11939 a method in which a memory had three banks in the above example while maintaining image quality. In this application, the applicant makes another proposal relating particularly to memory control in the above method.

(1) An image data decoding and displaying method of the present invention comprises steps of preparing a map set, each map describing a memory area where decoded data for a frame is stored; switching maps to be referred to every time display of one frame is completed so that a map for a next frame to be displayed is referred to; wherein a most recent map which came into force by map switching is referred to for display data reading in a normal state where a decode operation has been completed before a display operation, and a previous map which went out of force by map switching is again referred to in an abnormal state where a decode operation has not yet been completed by a time of displaying, so that a currently displaying frame is smoothly shifted midway to an appropriate part of a previously displayed frame for display.

Here, a "frame" is a display unit of an image, and a concept which includes a field or a picture according to MPEG.

In this arrangement, a memory area is determined for every frame so as to store decoded data of the frame. Correspondence between a memory and the decoded data of the frame is described in "a frame map". Each map is in charge of one frame. Since a plurality of maps are provided for pictures, they are collectively held as a map set. Every time one frame is displayed, a reference map is switched from the current one to the one for the frame to be displayed next.

In a normal state, where a decode operation has been completed prior to a display operation, display data is read with reference to the most recent map which came into force after map switching. The above data reading is possible because decoding of data for the next frame to be displayed has been completed by the time of reading.

On the other hand, in an abnormal state, where a decode operation is not yet completed by the time of displaying, a previous map which went out of force with map switching is again referred to instead. Then, the currently displayed frame (hereinafter referred to as "a present frame") is shifted midway to the appropriate portion of the previously displayed frame (hereinafter referred also to as "a previous frame") to display the latter. That is, decoded data of the previous frame is used as a substitute for the decoded data of a present frame whose decoded data has not been prepared in time for display. Accompanying this frame switching, a reference map is also switched so that the map for the previous frame is referred to, in order that a memory area where substitutional decoded data is stored can be correctly located. As a result of this map switching, display images can be smoothly shifted when a display frame is changed to the previous one. "A smooth shift" means a transaction in which image discontinuity due to display frame switching from the current frame to the previous frame is prevented by displaying an appropriate part or portion of the latter immediately after the part of the former which has been displayed by the time of switching. To be more specific, if the process enters into an abnormal state with the first two thirds of the current frame displayed, the latter one third of the previous frame should be displayed immediately following display of the first two thirds of the former.

According to one aspect of the present invention, an image data decoding and display apparatus comprises An image data decoding and displaying apparatus comprising: a decode memory controller for sequentially storing decoded data of a frame into a memory; a display memory controller for sequentially reading data from the memory so as to display the decoded data; and a judgement section for distinguishing between a normal state where a decode operation has been completed prior to a display operation, and an abnormal state where a decode operation has not yet been completed by a time of displaying, wherein the decode memory controller includes; a decode map set comprising a collection of maps, each map describing a memory area where decoded data for a frame is stored; and a decode map selector for selecting a map for a currently decoding frame from among the maps in the decode map set, the display memory controller includes; a display map set comprising a collection of maps, each map describing a memory area from which display data for every frame is read; and a display map selector for selecting a map for a currently displaying frame in the normal state, and a map for a previously displayed frame in the abnormal state.

With this arrangement, decoded data is sequentially stored into the memory by the decode memory controller. In storing, the map for the frame being decoded is selected from the decode map set and referred to so that data for each frame is properly stored in the memory area assigned to the frame. On the other hand, the display memory controller sequentially reads decoded data for display from the memory with reference to one of the maps in the display map set.

The judgement section judges if a normal relationship is preserved between decode and display operations. This judgement influences display state. The map of a present frame is selected from the display map set if it is preserved, namely, in a normal state, while the map of a previous frame is selected if it is not, namely, in an abnormal state. With this arrangement, decoded data for the previous frame is substituted for those which have not been decoded in time for display.

BRIEF DESCRIPTION OF THE DRAWINGS

The above and the other objects, features, and advantages will become further apparent from the following description of the preferred embodiment taken in conjunction with the accompanying drawings wherein.

DESCRIPTION OF THE PREFERRED EMBODIMENTS

Preferred embodiments of an image data decoding and displaying apparatus of the present invention will be described. This apparatus will demonstrate the image data decoding display methods of this invention. The method and apparatus which the present applicant suggested in JPA No. Hei 8-11939 (hereinafter referred to as "a premised technique") will first be described, followed by a description about the preferred embodiments of the present invention. Note that the premised technique is introduced here only for explanation purposes and this technique is not itself the present invention.

PREMISED TECHNIQUE

A premised technique will first be outlined.

An image data decoding method according to the premised technique relates to a method of decoding encoded input image data, storing it in display units (a frame or a picture in MPEG) into each unit memory area (bank) of a memory, and reading it in display units for display. In this technique, it is assumed that the number of unit memory areas in a memory is less than the maximum number of display units which are to be concurrently held in that memory in order to thereby ensure continuous display. That is, the premised technique would be applied to cases where three or less unit memory areas are provided in a memory.

In the premised technique, image data is first decoded. The decoded data is then collectively stored (that is, without unnecessary discontinuation or waiting depending on display conditions) into any available empty unit memory areas. If no empty unit memory area is available, the store operation is delayed until the start of the read operation of decoded data in any unit memory area for display. When the data in that unit memory area is read, the decoded image data is stored in areas which are emptied by the read operation. Specially, as described below, decoded data is stored at an address which is sixteen lines behind with respect to an address from which decoded data was read for display. The premised technique ensures effective use of the same memory area for both decode and display operations.

In the following, the premised technique will be described in detail.

Figure 5:
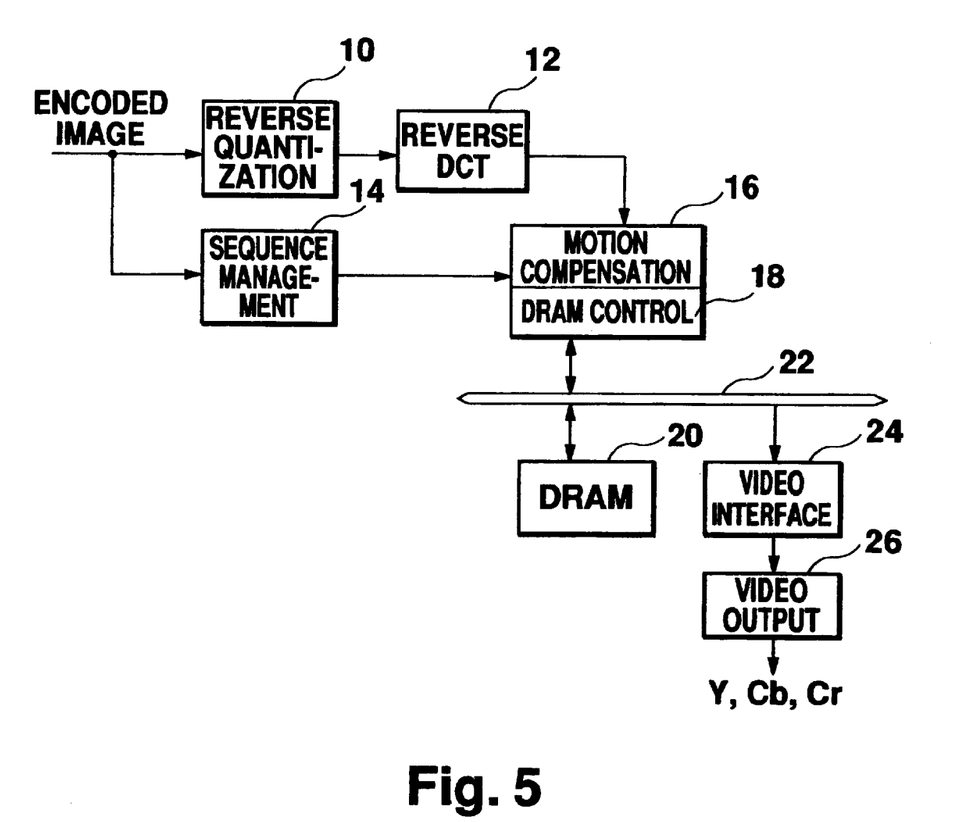
FIG. 5 is an overall schematic diagram of an image data decoding apparatus of the premised technique.

FIG. 5 is an overall schematic diagram of an image data decoding apparatus of the premised technique. The decode process will be first outlined referring to FIG. 5. In this technique, one 4 Mbit DRAM 20 is used as a memory for storing decoded data. The DRAM 20 has three banks.

CONFIGURATION

The image data decoding apparatus has a reverse quantization section 10 for performing a reverse quantization process of input encoded images; a reverse DCT section 12 for performing reverse DCT processes; a sequence manager 14 for identifying, for example, the type of pictures from the sequence headers of the bit stream of encoded images and providing timing signals necessary for motion compensation and DRAM control (described below) and picture identifying signals; a motion compensating section 16 arranged behind the reverse DCT section 12 for compensating motion on motion vectors used for forward and reverse prediction; and a DRAM control section 18 for generating addresses relative to a DRAM 20, RAS/CAS, etc. under instructions from the motion compensating section 16 and controlling the write operation of decoded data and read operation of displayed data. As a result of the motion compensation, the type and timing of the access to the DRAM 20 become clear, while the motion compensation is performed with the data read from the DRAM 20. Therefore, the motion compensating section 16 and the DRAM control section 18 are united in terms of circuit structure.

A DRAM bus 22 is a data bus where the data to be written into the DRAM 20 and the data read therefrom temporarily flow. A video interface section 24 is connected to this bus in order to input the display data read onto the bus and transmit them to a video output section 26. The video output section 26 outputs video signals Y (intensity), Cb (blue color difference), and Cr (red color difference) to a display device (not shown). The features of this premised technique include sequence managing section 14 for determining the continuous input of B pictures and the DRAM control section 18 for storing decoded data into the unit memory areas which become empty with the read operation of displayed data.

Figure 6:
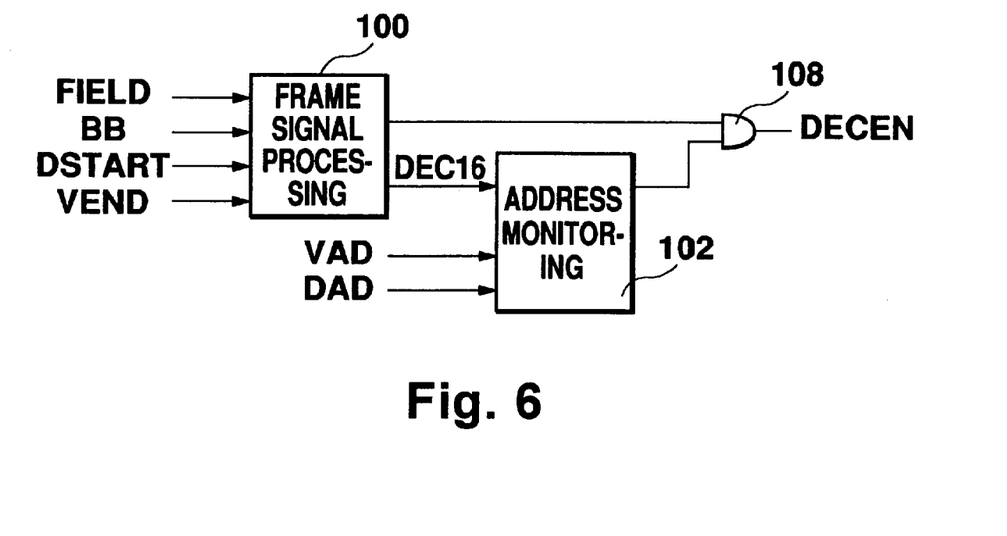
FIG. 6 is a diagram showing a method of controlling the timing of the decode operation of continuous B pictures by the DRAM controller 18.

FIG. 6 is a diagram showing a method for controlling the timing of the decode operation of continuous B pictures by the DRAM control section 18. In FIG. 6, "FIELD" represents the field signal of FIG. 4; "BB" is a signal which becomes continuously active (high) during the period from the beginning of the second B picture to the end of the last B picture when two or more B pictures are continuously input; "VEND" is a signal representing the time at which the read operation of displayed data is completed; "VAD" is a signal representing the address for display operation;

"DAD" is a signal representing the address for decode operation; and "DEC16" is a signal to be output during a period when the follow-up decode operation is sixteen lines behind with respect to the address from which data was read. An interval of sixteen lines is kept here because a decode operation is performed in the unit of microblocks consisting of sixteen lines. DEC16 becomes active in the second field so as to delay the start of the decode operation. With this delay arrangement, a read operation precedes a store operation when both operations are performed to the same bank. A read operation needs to precede a store operation because, in the premised technique, decoded data are stored in areas which become empty with the read operation.

In the premised technique, it is assumed that the follow-up decode operation with sixteen lines behind is achieved while DEC16 is active, and the display and decode operations are performed free-run after DEC16 was negated (that is, after $B_{n+1}$ picture). For this, the progress of decode and display addresses is observed using "VPASSD" and "DPASSV" signals. "VPASSD" is a pulse signal which becomes active in an abnormal state where display data are not decoded yet at the time of displaying since a display address is ahead of a decode address. "DPASSV," contrary to "VPASSD," is a pulse signal which becomes active when a normal state is restored from an abnormal state where a decode address is ahead of a display address.

In FIG. 6, a frame signal processing section 100 receives FIELD, BB, and VEND and outputs DEC16. Using a falling edge of DEC 16 as a trigger, the address monitoring section 102 compares VAD and DAD to thereby monitor entering into an abnormal state and restoration of a normal state. The monitored result is referred to in a memory control circuit (described later) which will be disclosed in this application.

Figure 7A:
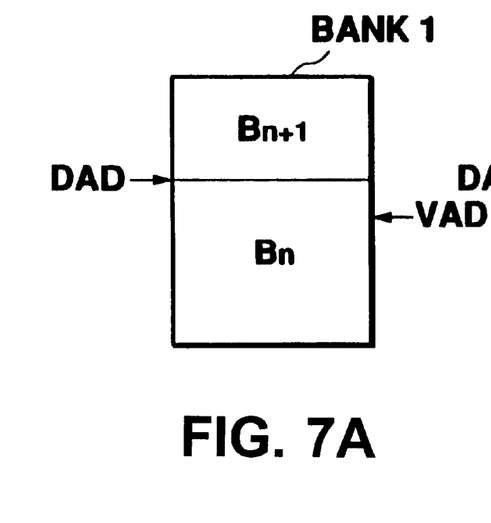
FIG. 7(a)–(c) are diagrams used for explaining a state where an address monitor 102 outputs VPASSD and DPASSV signals.
Figure 7B:
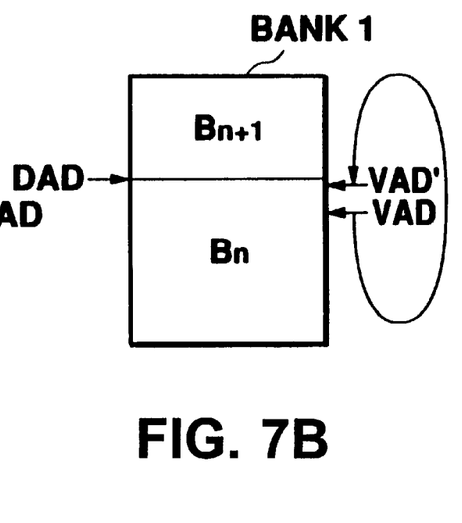
Figure 7C:
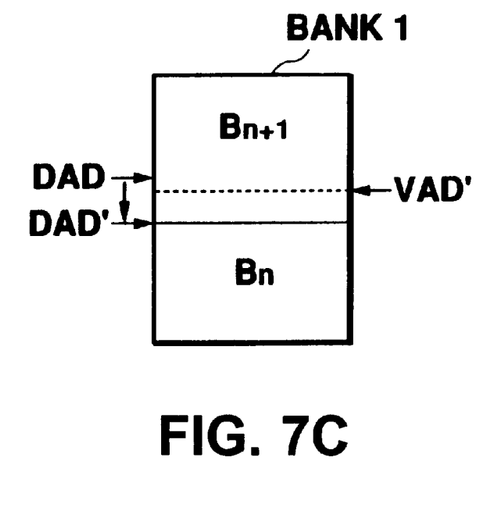

FIG. 7(a)–(c) are a diagrams used for explaining a state where address monitor 102 outputs VPASSD and DPASSV. Assume that a store operation for decode data and a read operation for display data are both performed with respect to bank 1 in memory. The DAD arrow in the diagram indicates the position of a decode address, while the VAD arrow indicates the position of a display address. Those positions move from top to bottom in the diagram.

In FIG. 7(a), the decoded data for $B_{n+1}$ picture are stored in the parts above the DAD position in bank 1. A display operation is performed with respect to the VAD position, currently displaying $B_n$ picture. As the VAD position proceeds, the decoded data for picture $B_{n+1}$ are sequentially stored into memory areas which have became empty with the display operation.

FIG. 7(b) shows a state in which the decode operation is halted for some reason (such as, adjustment of output timings between audio and images makes the latter to wait), and a display address exceeds a decode address after a cycle. That is, starting from the VAD position, the display address progresses while the decode address is suspended. The display address reaches the end of the bank 1, upon completing display of $B_n$ picture, and returns to the top address of the bank 1 with the start of $B_{n+1}$ picture display. The display address keeps progressing until it reaches the VAD' position. In this position, however, the decoded data for $B_{n+1}$ picture is not available yet. Thus, VPASSD signal is output to notify that the process has entered into an abnormal state.

FIG. 7(c) shows a state where the decode operation which has been suspended resumes, and a decode address exceeds a display address. In this diagram, the decode address has progressed from DAD to DAD'. Here, the order between decode and display addresses has been normalized, and DPASSV is thus asserted.

OPERATIONS

When an encoded image is input, its type is identified in the sequence managing section 14. If it is an I picture, the decode operation will be completed through the reverse quantization, the reverse DCT, and the motion compensation processes as a normal procedure, because the decode operation can be done by reference to the I picture alone. The decoded data in turn is stored in macroblocks in an empty bank of the DRAM 20. Since an I picture is decoded first in the GOP, the DRAM 20 has empty banks. There is no problem storing the data. If an encoded image is a P picture, the same processing is performed, since three banks in the DRAM 20 are sufficient for decoding a P picture, as shown in FIG. 4.

Figure 8:
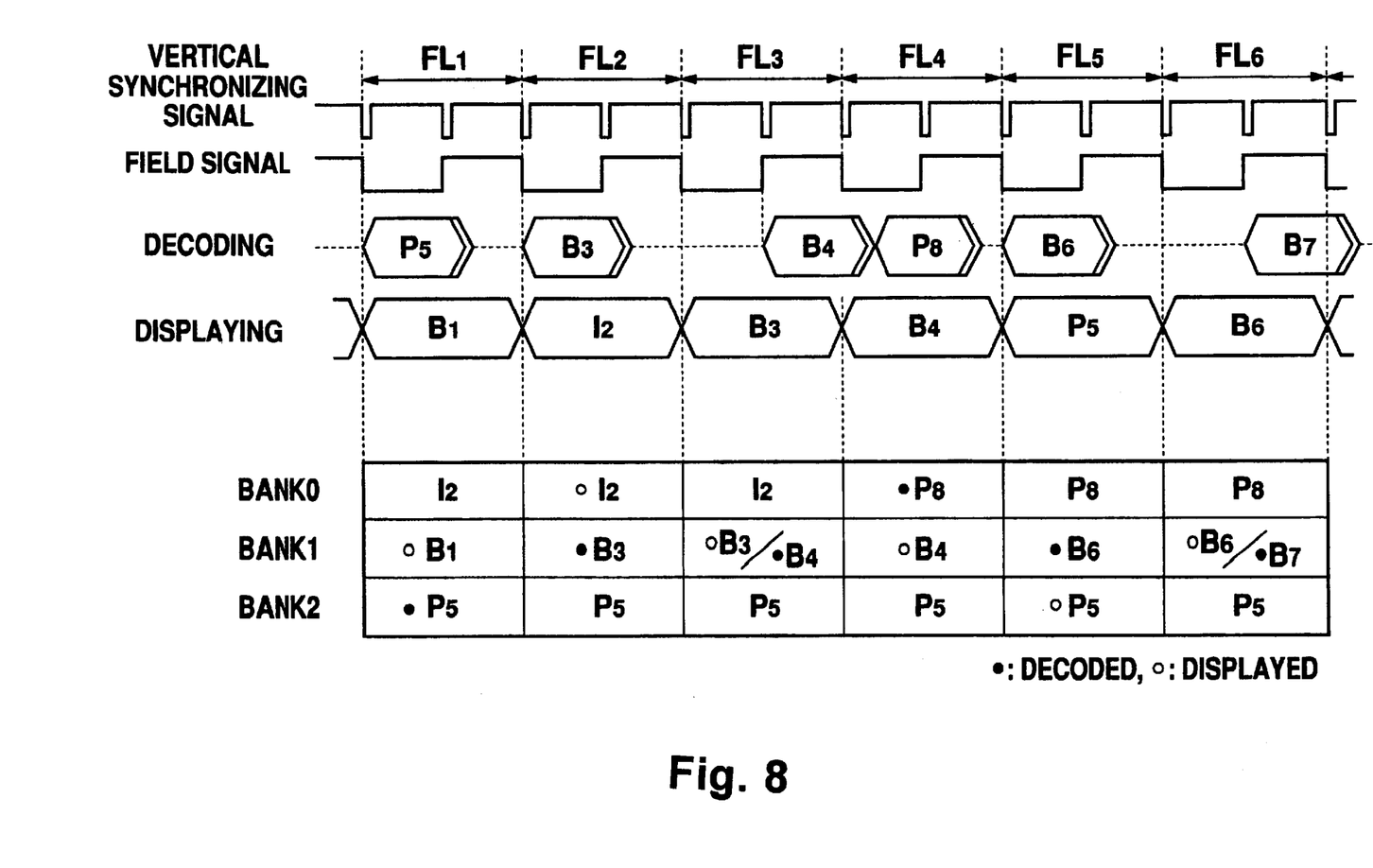
FIG. 8 is a diagram showing the process timing of decode and display operations by an image data decoding apparatus of the premised technique.

However, this case does not apply if an encoded image is a B picture. FIG. 4 shows that in the frame periods FL3 and FL6 when the second B picture among the continuously input pictures is decoded, four banks are necessary in a conventional apparatus. FIG. 8 is a diagram showing the timing of the decode and display processes in the apparatus for the premised technique. FIG. 8 shows that in FL3 and FL6, a bank 1 is shared by the two B pictures. (Hereinafter, frame display periods such as FL3 and FL6 are referred to as "shared periods.") A conventional device cannot originally hold two frames of data in one bank, but the apparatus for the premised technique can achieve this by the method shown in FIG. 6.

Figure 9:
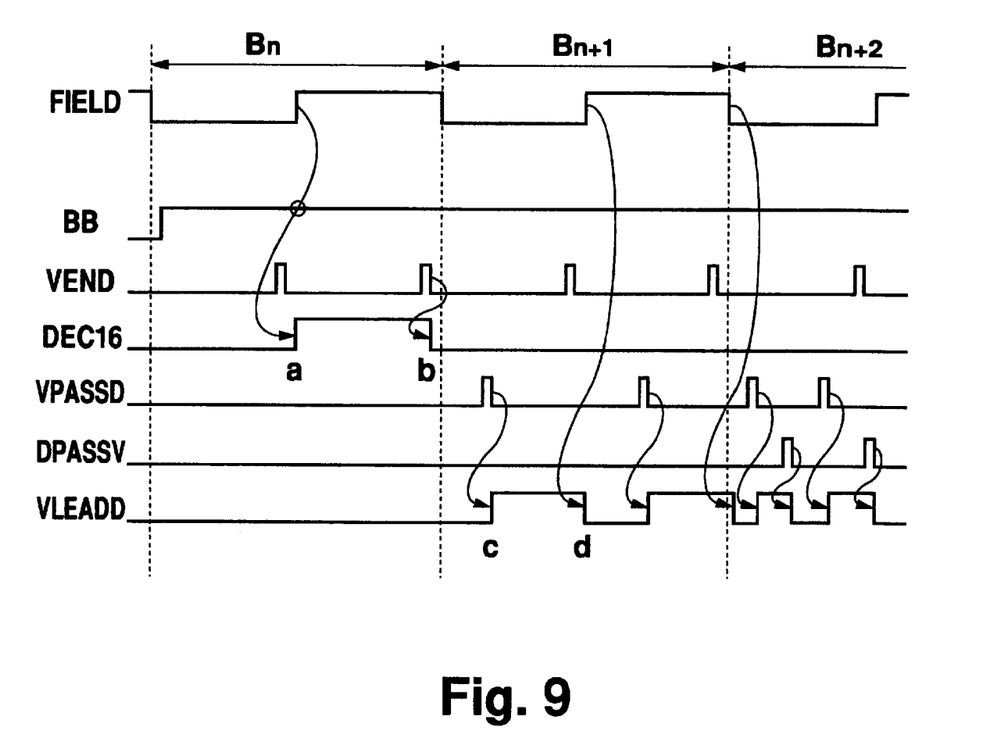
FIG. 9 is a timing chart showing the follow-up decode operation using the method shown in FIG. 6.

FIG. 9 is a timing chart showing follow-up decode operation using the method shown in FIG. 6. There are three B pictures $B_n$–$B_{n+2}$ shown in FIG. 9. $B_n$ picture is the second picture of continuously input B pictures; $B_{n+1}$ picture is the third one; and $B_{n+2}$ is the fourth one. VLEADD is a status signal which is active during an abnormal state where a display operation is ahead of a decode operation (many abnormal states are drawn here only for explanation). VLEADD is generally toggled according to VPASSD and DPASSV. VLEADD is reset at filed change points because the display address hops back to the start address.

In FIG. 9, BB becomes active with picture $B_n$. In FL with active BB, a decode operation is delayed until the beginning of the second field. Therefore, DEC16 becomes active at the second field (point a). DEC16 is negated with the negation of VEND (point b). If the display operation gets ahead of the decode operation after one cycle, while the latter is delayed for some reason, VLEADD becomes active (c point). VLEADD is reset at the change points of fields (d point). Hereinafter, VLEADD behaves based on the reset operation at the change points of fields and the toggle operation according to VPASSD and DPASSV. This makes it possible to discriminate between a normal state and an abnormal state.

The above is a method of accomplishing shared periods by the premised technique. Note that the start of the decode operation of the B picture is delayed, and its decode operation may therefore be completed in the next FL. But in this case the display operation of the next FL is performed from the beginning of the frame; therefore, while a part near the start is displayed, the decode process of the rest will be completed.

EMBODIMENT 1

A first preferred embodiment of the present invention will next be described. In the premised technique, the start of the decode operation of the subsequent B picture in a shared period is delayed until the start of the second field. As stated above, the decode operation of the B picture may be completed in the next FL, which naturally has its delay limits. In this embodiment, an apparatus in which the decode operation is started in the first field of a shared period by using memory areas other than the three bank areas will be disclosed. A first object of this embodiment is to produce sufficient time for a decode operation.

A second object is to properly process an abnormal state. According to the premised technique, when a plurality of B pictures are continuously input, decode and display operations are conducted free-run with respect to the third and thereafter B pictures. Therefore, consideration must be given to dealing with an abnormal state. In this embodiment, if a decode operation is in a delay, a previously displayed picture is displayed again. In this event, the correct location in which the previous displayed picture is held must be known, because memory areas other than the three bank areas are used in this embodiment. To obtain a correct location, a map is used. A map is prepared for every picture, showing the memory area which stores the picture. Referring to this map, a previously displayed picture is read.

In this process, importantly, a discontinuous image from the currently displaying picture must not be read when switching pictures to be read. If the process enters into an abnormal state while the m-th macroblock of $B_{n+1}$ picture is being displayed, the (m+1)th macroblock of $B_n$ picture should be read for display. (In this embodiment, however, display pictures are switched along a macroline (described later), not in a macroblock.)

Another consideration is made in this embodiment when a normal state is restored from an abnormal state. In an abnormal state, a map for the previously displayed picture is referred to. However, upon restoration of a normal state, a reference map must be switched to the map for the present picture. In this embodiment, a counter is used for map switching. That is, a display counter is decremented by one when the process enters into an abnormal state so that an immediately preceding map is referred to. Further, it is then incremented by one when the process returns to a normal state so that the map for the currently displaying picture is referred to.

CONFIGURATION

Figure 10:
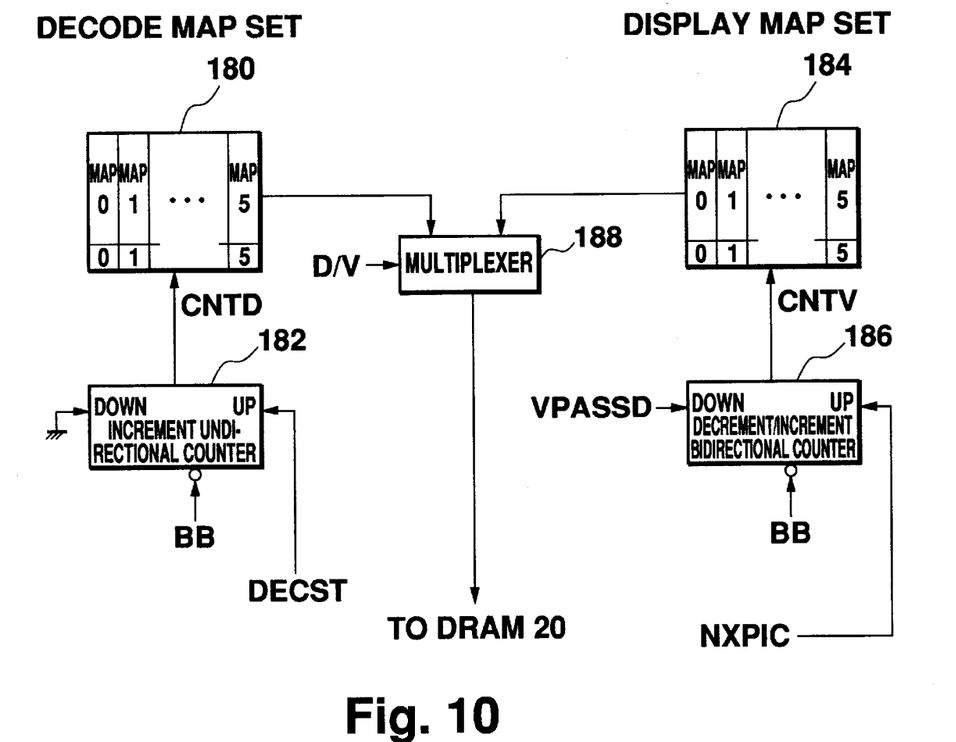
FIG. 10 is a diagram showing an internal configuration of a DRAM controller 18 of embodiment 1.
Figure 11:
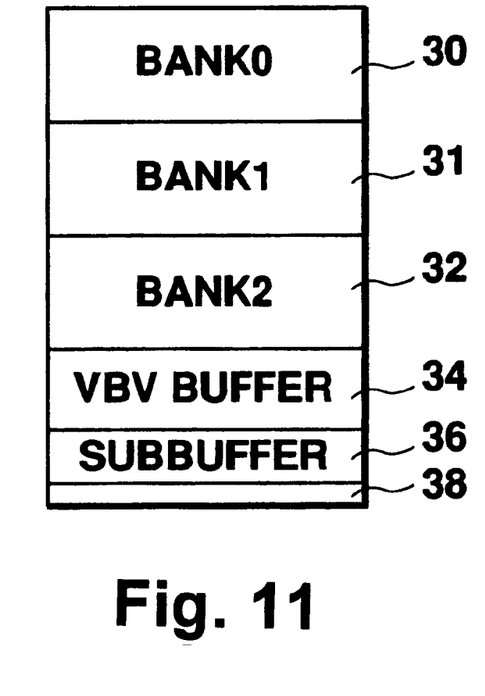
FIG. 11 is a diagram showing area sharing in a DRAM 20 of embodiment 1.
Figure 12:
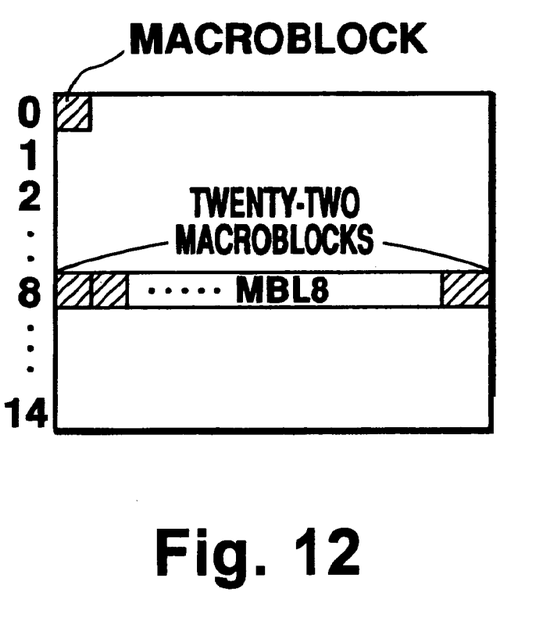
FIG. 12 is a diagram showing the relationship between one frame and macroblock lines.

FIG. 10 is a schematic diagram showing an internal configuration of a DRAM controller 18 of the present embodiment. FIG. 11 is a diagram showing area sharing in DRAM 20. FIG. 12 is a diagram showing the relationship between one frame and macroblock lines (hereinafter referred to as "MBL.")

As shown in FIG. 11, the DRAM 20 has banks 0, 1, and 2 (numbered 30–32, respectively) and a VBV buffer 34. In addition, it also has a subbuffer or secondary buffer 36 for decoded data in this embodiment. An area smaller than the minimum area available for a subbuffer is shown as a fragmentary area 38 (unused). While the store and read operations for the decode data of continuous B pictures may to be performed only to bank 1, those operations are directed to the entire area combining bank 1 and the subbuffer 36 in this embodiment. Resultingly, decode and display operations can share this memory area.

FIG. 12 shows the relationship between one frame and MBL. With NTSC, one frame is comprised of 22×15 (horizontal×vertical) macroblocks. The twenty-two horizontal macroblocks together are referred to as a macroblock line. Therefore, one frame is comprised of fifteen macroblock lines which pile up. In FIG. 12, fifteen MBLs are numbered MBL0, 1, . . . , 14 from the top and an MBL8 is depicted as an example. Each MBL corresponds to 352 (16×22) pixels×16 lines. Each of the banks 0–2 of FIG. 11 is comprises of fifteen MBLs. In the case of a 4 Mbit DRAM, areas corresponding to about three MBLs can be reserved for the subbuffer 36 with the areas for the VBV buffer 34 subtracted. Here it is assumed that they correspond to three MBLs.

FIG. 10 shows circuitry within a DRAM controller 18, which relates to generation and outputting of memory addresses for accessing a DRAM 20. This circuit includes roughly a decode map set 180 for generating memory addresses for storing decode data, a unidirectional senary (six step) counter 182 for increment only, a display map set 184 for generating memory addresses for reading display data, and a bidirectional senary counter 186 for both increment and decrement. Decode and display memory addresses are both input in a multiplexer 188 so that either one of them is selected. The selected address is supplied to the DRAM 20. The multiplexer 188 is controlled via a selection signal D/V which indicates which of decode or display operation is allowed to access the DRAM 20. For instance, high state of the signal D/V indicates access by decode operation, while low state indicates access by display operation.

The decode map set 180 includes six types of maps 0–5, each corresponding to one of the pictures. This number of the types available, namely six, is determined due to the fact that, when fifteen MBLs for one picture are sequentially stored into the eighteen MBL memory areas in the bank 1 and the subbuffer 36, the map for picture $B_{n+6}$ returns to that for $B_n$ picture. To be more precise, a finite number of maps are used circularly as follows, picture $B_{n+6k}$ is associated with the map 0 picture $B_{n+6k+1}$ is associated with the map 1 picture $B_{n+6k+5}$ is associated with the map 5, wherein the second and thereafter pictures of continuously input B pictures are denoted as $B_n$, $B_{n+1}$, and so on.

A unidirectional counter 182 is a senary counter which increments its output CNTD when a picture decode start signal DECST, which is asserted for every picture, becomes active. This counter 182 keeps counting from after the second one of continuously input B pictures until the last one. In cases other than the above, it is kept reset with an inactive BB signal. In this embodiment, the output timing of DECST is adjusted such that CNTD shows 0 for $B_n$ picture.

A decode map set 180 has an identical structure to that of the display map set 184. The bidirectional counter 186 is also reset with BB, decremented via VPASSD, and incremented via NXPIC. When VPASSD is asserted, in other words, when the process enters into an abnormal state, the counter 186 is decremented so that an immediately preceding map is selected to be referred to in order to display an immediately preceding picture. On the other hand, when NXPIC is asserted, the counter 186 knows restoration of a normal state as NXPIC becomes active under an OR condition based on a signal asserted once for every frame (such as an FIELD signal) and DPASSV. The counter 186 increments CNTV, which has been decremented by one, so that the map which should have been originally referred to is referred to. In addition to the above, another logical OR is necessary in order to advance maps for every time a frame is displayed in a normal operation.

As is obvious from FIG. 10, as long as a normal state continues, identical maps are always referred to in the decode map set 180 and the display map set 184. In an abnormal state, on the other hand, the map referred to in the latter is one-map older than that in the former.

Figure 13:
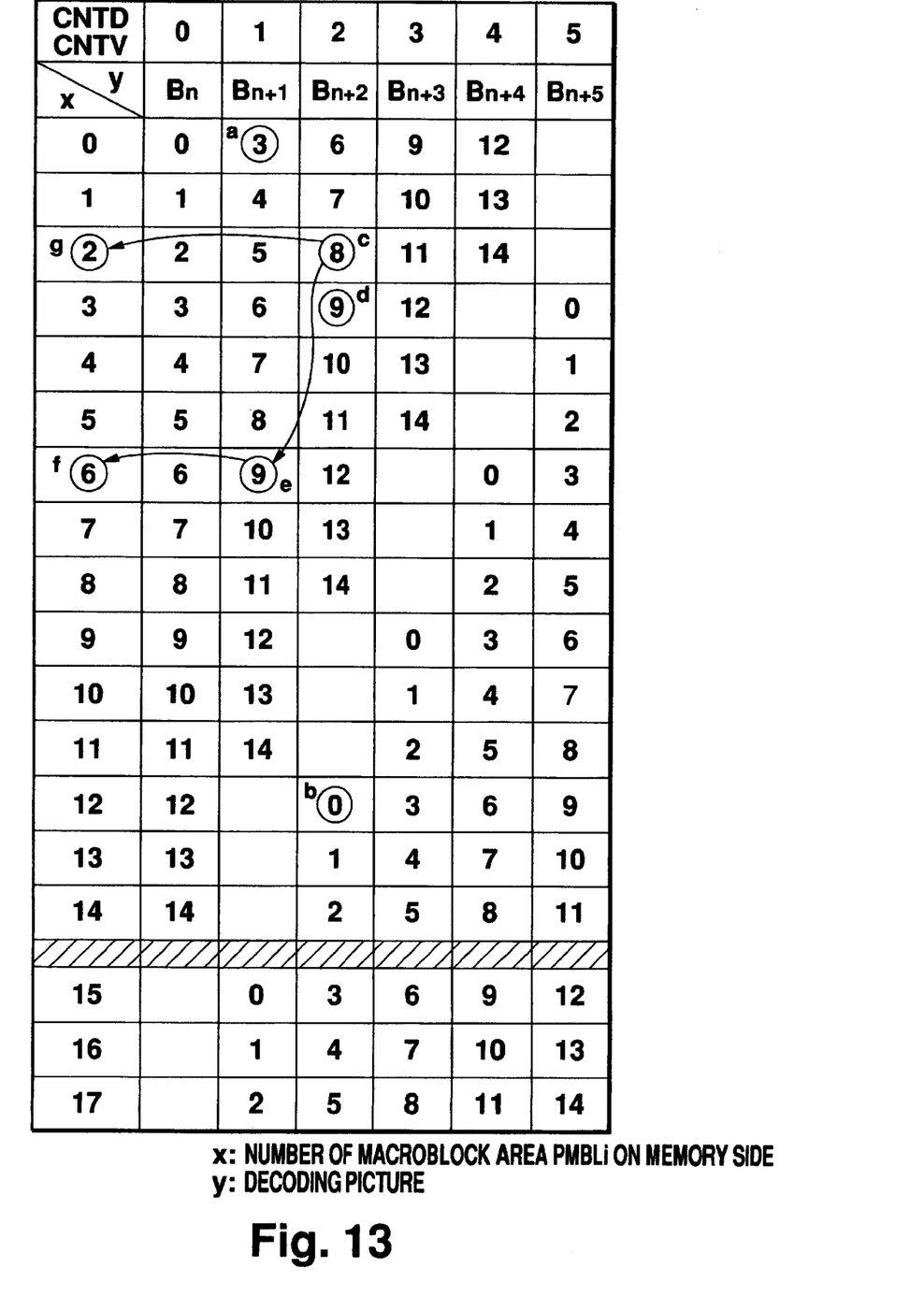
FIG. 13 is a diagram showing the MBL areas in the bank 1 and the subbuffer 36 where MBLs 0–14 of each $B_n$–$B_{n+5}$ pictures are stored.

FIG. 13 is a diagram showing the MBL areas of the specific bank 1 and the subbuffer 36 in the DRAM 20 where MBLS 0–14 of $B_n$–$B_{n+5}$ pictures are stored. "x" of FIG. 13 represents fifteen MBLs memory areas in the bank 1, numbered 0–14 (physical addresses). The numbers 15–17 are given to the subbuffer 36 as its physical addresses. They are denoted as PMBL 0–17.

"y" in FIG. 13 represents decoded pictures. The numbers 0–14 under each picture are the numbers of fifteen MBLs constituting that picture, which are denoted as LMBL. LMBLs of $B_i$ picture are represented as $LMBL_i$ 0–14. In the diagram, each column headed by each picture name, such as $B_n$, correspond to the map of the corresponding picture (a picture map). At the top of the diagram, a row for CNTD and CNTV values is provided because maps are selected referring to CNTD and CNTV values.

OPERATIONS

The operations of the apparatus according to this embodiment will be described focusing on memory address control.

Picture $B_n$ is decoded and $LMBL_n$ 0–14 of this picture $B_n$ are stored into PMBL 0–14 as shown n FIG. 13.

Subsequently, the decode operation of picture $B_{n+1}$ is started. In the premised technique, the start of the decode operation for picture B is uniformly delayed until the start of the second field. In this embodiment, however, the decode operation starts from the first field, utilizing the empty areas in the subbuffer 36. Thus, sufficient time is produced for a decode operation to achieve the first object of this embodiment. $LMBL_{n+1}$ 0–2, corresponding to the first three MBLs of the decoded data of $B_{n+1}$ picture, are sequentially stored into the empty PMBLs 15–17 in the subbuffer.

Even during the store operation of the decoded data of $B_{n+1}$ picture, a read operation for $B_n$ picture from bank 1 continues to display this picture. Before the store operation with respect to PMBLs 15–17 is completed, reading of $LMBL_n$ 0 from PMBL 0 is usually completed. Thus, $LMBL_{n+1}$ 3 can be written into PMBL 0, overwriting $LMBL_n$ 0 (point a). Write operations continue similarly until the decoded data for $B_{n+1}$ are all stored.

Following the above, the decode operation for $B_{n+2}$ picture is performed. As shown in FIG. 13, up to PMBL 11 are occupied by the data of $B_{n+1}$ picture, so that $LMBLs_{n+2}$ is stored in PMBL 12 and thereafter (point b). Subsequently, decoded data are cyclically stored into empty areas in PMBLs 0–17 in the same manner as mentioned above.

Occurrence of an abnormal state is handled as follows. Assume that VPASSD is output while $LMBL_{n+2}$ 8 is displayed (point c). In such a case, decoded data for $LMBL_{n+2}$ 9 is not available yet for display (point d). With the VPASSD, the bidirectional counter 186, or CNTV, is decremented, so that the map 1 for picture $B_{n+1}$ is referred to in the display map set 184 instead of the map 2 for $B_{n+2}$. After this map switching, $LMBL_{n+1}$ 9 (point e)is read to be displayed in place of $LMBL_{n+2}$ 9 (point d). This substitution is based on an empirical rule that, between adjacent pictures images in identical MBL areas (LMBL 9 here) are closest in terms of data to each other. Reference to FIG. 13 proves that $LMBL_{n+1}$ 9 is stored in PMBL 6 of DRAM 20 (point f). Thus, an address which is ahead of PMBL 2 by three is output from the display map set 184. The multiplexer 188 then selects the address which was output from the display map set 184, and outputs it to the DRAM 20, so that a desired image is read.

In this embodiment, the most recently decoded data is stored by being written into a memory area, overwriting other decoded data which have already been stored therein. In spite of this storing method, it is possible in this embodiment to read substitutional image data from those of an immediately preceding picture when the process enters into an abnormal state because such data is not yet overwritten. This is realized through provision of a subbuffer 36 and an arrangement in which the LMBL number of overwriting data is smaller than that of overwritten data. Provided that a process enters into an abnormal state at point c in FIG. 13, PMBLs 3–8 of DRAM 10 (point d and below) are not yet overwritten because data for $LMBL_{n+2}$ 9 and thereafter are not yet available at this stage. Thus, it is possible to read $LMBL_{n+1}$ 9 from PMBL 6.

On the contrary, when a normal state is restored, DPASS is issued. With this, the bidirectional counter 188 is incremented, so that a map for the present picture is referred to. In this picture switching, a skip operation is necessary so that a display address is returned from PMBL9 to PMBL7. This skip operation is automatically carried out accompanying map switching, and requires no special control. Besides the cases where DPASSV is asserted the bidirectional counter 188 is incremented when display fields are switched. This is because a decode address is assumed to catch up with a display address during a period of retracing. Although DPASSV is not explicitly issued in such cases, it may be issued under address observation.

According to this embodiment, freeze display (still display of images) or the like is achievable. For such display, the apparatus may be structured such that a decode operation is halted while a display operation continues with display addresses kept progressing during freeze display. That is, although VPASSD is asserted every time a display address circulates around the banks, NXPIC is similarly asserted. This results in selection of identical maps between decode and display sides, achieving freeze display. In addition, this embodiment is advantageous in other cases, such as where a decode operation is halted due to synchronization between output audio and images.

EMBODIMENT 2

Although a single pair of decode and display map sets are provided in embodiment 1, a plurality of pairs are provided in embodiment 2. For instance, for an image data decoding and displaying apparatus which is capable of handling various display modes (NTSC/PAL, normal/high resolution, etc.) and screen sizes (hereinafter referred to as "a display mode, etc."), the memory areas thereof shown in FIG. 11 may naturally be used differently, depending on the situation. The number of maps to be contained in a single map set should vary accordingly, and a plurality of map sets must therefore be prepared beforehand. In this embodiment, a selector is provided for selecting a necessary map set from among a plurality of map sets provided, depending on a display mode, etc., in use.

Further, when the number of maps contained in a map set varies, a suitable counter must be used for each map set. Although a senary counter is used in the first embodiment, a decimal counter is necessary when a map set containing ten maps is selected. In this embodiment, the step value of a counter is also switched according to a display mode, etc., in use. When the maximum number of PMBL areas in one bank 1 is represented by s, the maximum number of PMSL areas in one sub-buffer 36 is represented by t, and a greatest common divisor of s and t is represented by u, (s/u+1) maps are generally necessary. With such number of maps provided, a counter must be set at base (s/u+1).

In this embodiment, maps of a different type (retransformation maps) are also provided. By referring to these maps, addresses are more precisely transformed so as to accord to a display mode, etc., in use. The maps shown in FIG. 10 are only rearrangement of MBLs to which decoded data is stored, and determined simply on the above s and t. To achieve various display mode, etc., various complicated address management is necessary, in addition to the switching performed in the embodiment 1. Retransformation maps are used for such precise management. For instance, data for a normal NTSC display and a wide NTSC display are arranged differently in memory since microblocks in respective microblock lines must be arranged according to a display mode. The optimum arrangement is different for every display mode because each microblock contains Y-blocks for luminance, Cb-blocks for blue color difference, and Cr blocks for red color difference.

Figure 14:
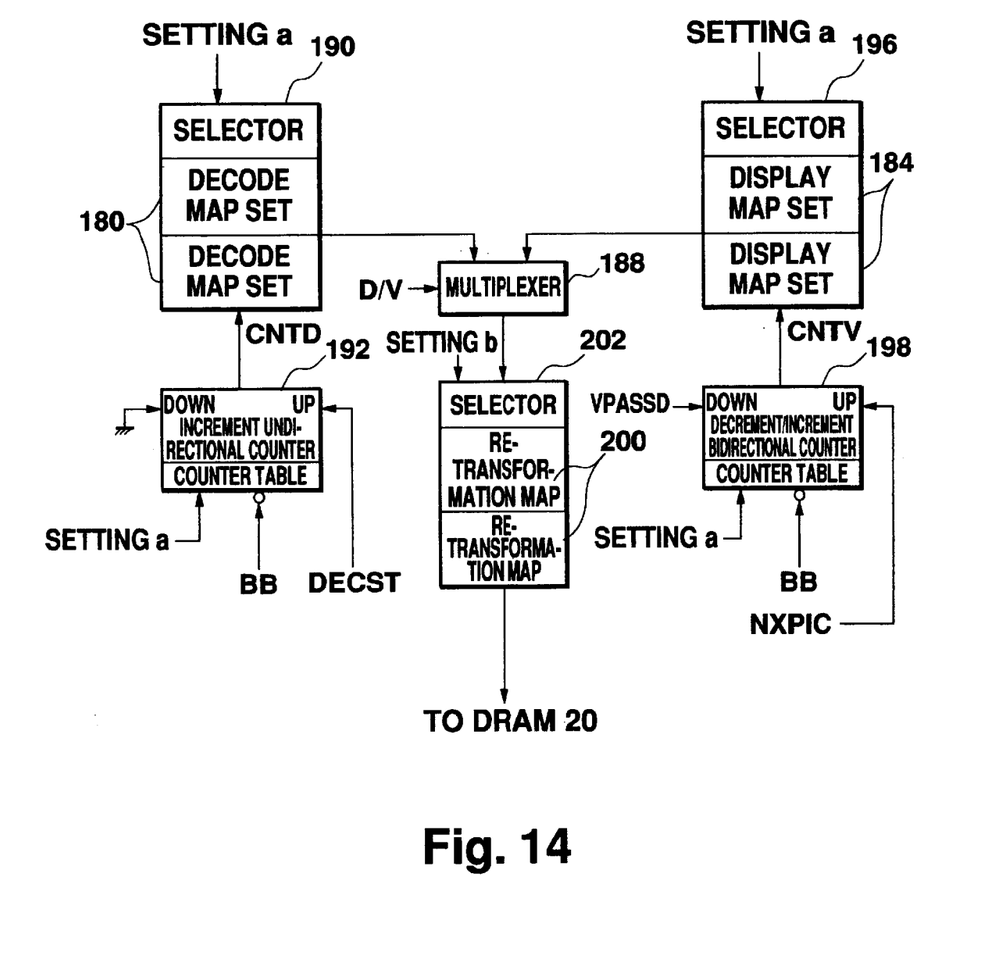
FIG. 14 is a diagram showing an internal configuration of a DRAM controller 18 of embodiment 2.

FIG. 14 shows an internal configuration of a DRAM controller 18 of this embodiment. This diagram is different from that of FIG. 10 in the following points:

1. Two pairs of decode map sets 180 and two pairs of display map sets 184 are provided. Selectors 190 and 196 are provided so as to select a desired map set from the respective two pairs of decode map sets 180 and display map sets 184 referring to a signal (setting a).
2. An unidirectional counter 192 and a bidirectional counter 198 are of automatic reload type each, equipped with a counter table referring to the setting a. According to the setting a, an appropriate base value is selected from the counter table and is pre-set to the counters.
3. Two pairs of re-change maps 200 and a selector 202 are provided behind the multiplexer 188. The selector 202 selects one pair of the re-change maps 202 according to a signal (setting b). Referring to the selected re-change map, a memory address is retransformed and supplied to the DRAM 20.

Note that three or more pairs of map sets and re-change maps may be provided. For instance, three pairs of map sets may be provided while five sets of re-change maps may be provided. The settings a and b may be different.

With the above arrangement, various display modes can be accommodated by the same apparatus if settings a and b determined are according to a display mode, or the like.

What is claimed is:

1. A method for sequentially storing decoded data for frames into a memory using a decode operation and sequentially reading this data for display using a display operation, the method comprising:

preparing a map set, each map defining a memory area where decoded data for a frame is stored;

selecting a map to be displayed for a next frame every time display of one frame is completed;

initiating a first decode operation in which data is written to a memory area defined by a first map;

initiating a second decode operation in which data is written to a memory area defined by a second map, the memory area defined by the second map at least partially overlapping the memory area defined by the first map and comprising a plurality of memory blocks;

initiating a display operation in which data is read from a memory area defined by a display map;

selecting the second map as the display map in a normal state in which the second decode operation for a selected memory block of the plurality of memory blocks has been completed before the display operation for the selected memory block has begun; and selecting the first map as the display map in an abnormal state in which the second decode operation for the selected memory block has not yet been completed by a time for executing the display operation for the selected memory block, and selecting a corresponding memory block within the memory area defined by the first map such that a currently displaying frame is smoothly shifted to an appropriate part of a previously displayed frame for display.

2. An image data decoding and displaying apparatus comprising:

a decode memory controller configured to perform first and second decode operations for sequentially storing decoded data of frames into memory areas that at least partially overlap and comprise a plurality of memory blocks;

a display memory controller configured to perform a display operation for sequentially reading data from a memory area; and a judgement section for distinguishing between a normal state in which the second decode operation for a selected memory block of the plurality of memory blocks has been completed prior to the display operation for the selected memory block, and an abnormal state in which the second decode operation for the selected memory block has not yet been completed by a time for executing the display operation for the selected memory block, wherein the decode memory controller includes:

a decode map set comprising a collection of maps, each map defining a memory area where decoded data for a frame is stored; and a decode map selector for selecting a map for a currently decoding frame from among the maps in the decode map set, and wherein the display memory controller includes:

a display map set comprising a collection of maps, each map defining a memory area from which display data for every frame is read; and a display map selector for selecting a map corresponding to the second decode operation in the normal state, and a map corresponding to the first decode operation in the abnormal state.

3. An apparatus as defined in claim 2, wherein the maps in the display map set each describe the same relationship between a frame and a memory area as corresponding maps in the decode map set.

4. An apparatus as defined in claim 2, wherein the judgement section distinguishes between the normal state and the abnormal state through monitoring of progress of memory addresses to which decoded data are stored, and of progress of memory addresses from which data for display are read.

5. An apparatus as defined in claim 2, wherein the decode map selector comprises a unidirectional counter which is incremented every time one frame is decoded such that a map to be referred to in the decode operation is selected according to an output of the counter.

6. An apparatus as defined in claim 2, wherein the display map selector comprises a bidirectional counter which is decremented every time one frame is displayed and every time the apparatus enters into the abnormal state from the normal state, and incremented every time the apparatus restores the normal state such that a map to be referred to in a display operation is selected according to an output of the counter.

7. An apparatus as defined in claim 2, further comprising a selector for selecting either one of a map selected by the decode map selector or a map selected by the display map selector, and for informing the memory of a memory address specified by the selected map.

8. An apparatus as defined in claim 7, wherein the selector selects the map selected by the decode map selector when storing decoded data into the memory, and selects the map selected by the display map selector when reading data for display from the memory.

9. An apparatus as defined in claim 5, wherein the decode map controller includes a plurality of decode map sets each set being selectable, and a base value of the unidirectional counter is matched with a number of maps in the selected decode map set.

10. An apparatus as defined in claim 9, wherein the unidirectional counter comprises a pre-settable counter, and the base value of the unidirectional counter can be changed by altering a preset value.

11. An apparatus as defined in claim 2, wherein the display memory controller includes a plurality of display map sets each set being selectable, and a base value of the bidirectional counter is matched with a number of maps in the selected display map set.

12. An apparatus as defined in claim 11, wherein the bidirectional counter comprises a pre-settable counter, and the base value of the bidirectional counter is changed by altering a preset value.

13. An apparatus as defined in claim 2, further comprising a retransformation map for transforming a memory address determined by the map selected by the decode map set and a memory address determined by the map selected from the display map set according to a same rule.

14. An apparatus as defined in claim 6, further comprising a retransformation map for transforming a memory address output from the selector according to an externally set condition.

* * * * *